No. 865,540. PATENTED SEPT. 10, 1907.
W. A. STOCKTON.
COTTON CHOPPER.
APPLICATION FILED MAY 23, 1907.
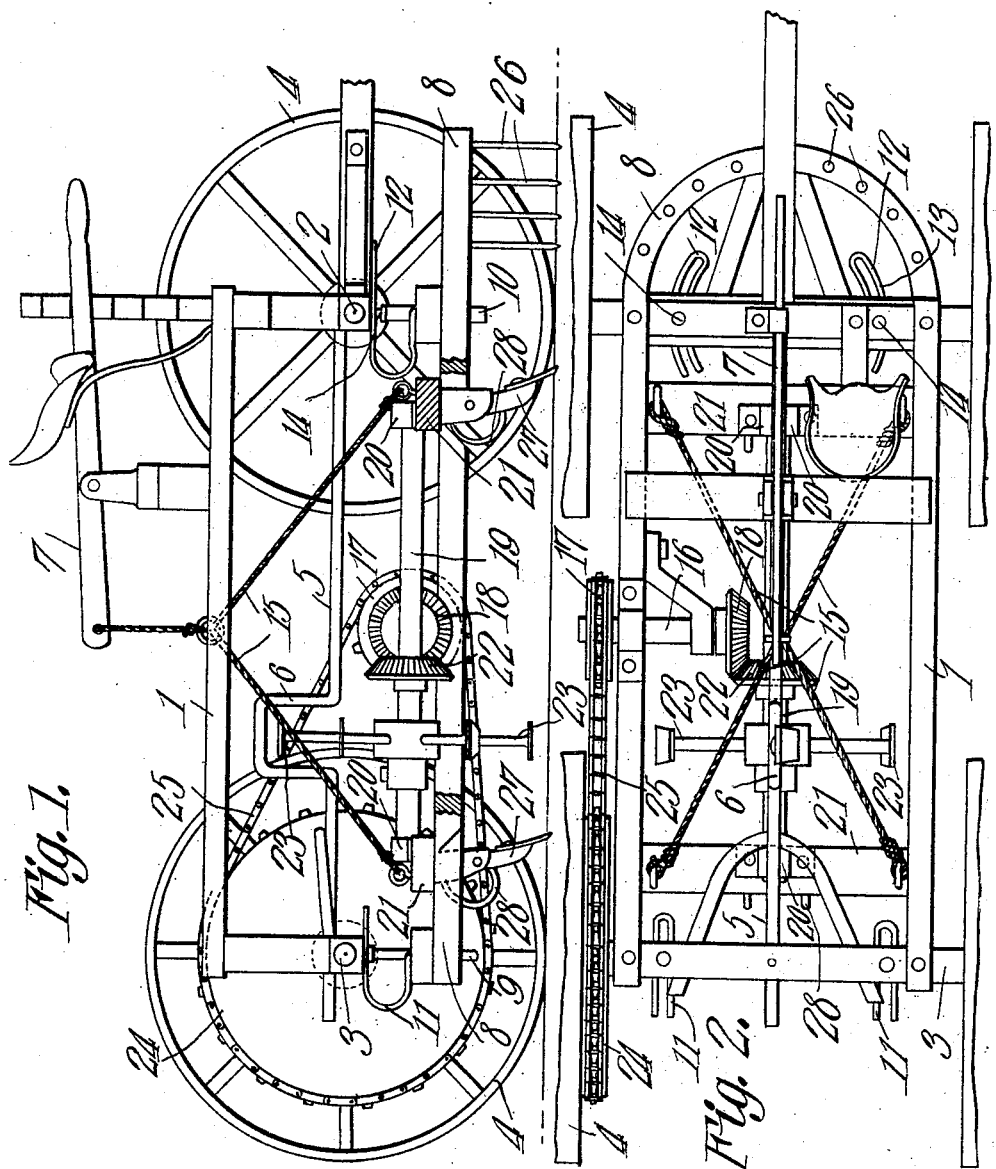
WITNESSES:
William A. Stockton,
INVENTOR.
By C. A. Snow & Co.
ATTORNEYS

UNITED STATES PATENT OFFICE.

WILLIAM ALONZO STOCKTON, OF EASTMAN, MISSISSIPPI.

COTTON-CHOPPER.

No. 865,540.  Specification of Letters Patent.  Patented Sept. 10, 1907.

Application filed May 23, 1907. Serial No. 375,333.

*To all whom it may concern:*

Be it known that I, WILLIAM ALONZO STOCKTON, a citizen of the United States, residing at Eastman, in the county of Itawamba and State of Mississippi, have invented a new and useful Cotton-Chopper, of which the following is a specification.

This invention has relation to cotton choppers and it consists in the novel construction and arrangement of its parts as hereinafter shown and described.

The object of the invention is to provide an implement as indicated which is adapted to be drawn along a row of standing plants and which is provided with a series of rotating hoes which are adapted to cut out the plants at intervals and leave other plants standing in the row between such intervals.

The implement consists primarily of a frame which is mounted upon supporting wheels and which is provided at its forward end with a pivoted axle. A frame supporting the cotton chopping mechanism is located under the first said frame and the cotton chopping mechanism or hoes are held toward the ground under spring tension, the said spring being interposed between the two said frames. A lever mechanism is mounted upon the first said frame and is connected with the second said frame and may be manipulated in order to raise the last said frame against the tension of the said interposed springs. Means is provided for transmitting movement from one of the supporting wheels to the chopping mechanism.

In the accompanying drawing:—Figure 1 is a side elevation of the chopper with parts in section, and Fig. 2 is a top plan view of the same with parts broken away.

The chopper consists of the superimposed frame 1 which is mounted upon the forward pivoted axle 2 and the rear axle 3 which is fixed with relation to the frame. The axle 2 is pivoted to swing horizontally in a manner similar to the forward axle of an ordinary wagon running gear. The ground wheels 4 are journaled upon the said axle. The reach bar 5 connects the said axles together and is provided at an intermediate point with the upwardly disposed arch portion 6. The lever 7 is fulcrumed upon the superimposed frame 1. The depending frame 8 is located under the superimposed frame 1 and may move vertically with relation to the same along the bolts 9 and 10 which depend from the frame 1, the latter of which is the king bolt upon which the axle 2 is pivoted. The springs 11 are interposed between the rear axle 3 and the rear portion of the frame 8 and the springs 12 are interposed between the pivoted axle 2 and the forward portion of the frame 8. The said springs are under tension in order to hold the ground engaging members carried by the frame 8 in contact with the ground. The springs 12 are provided with arcuate portions 13 which lie in arcs struck from the king bolt 10 as a center and the pins 14 are attached to the axle 2 and operate laterally against the arcuate portions 13, whereby the pivoted axle 2 may turn laterally and still have the springs interposed between the same and the frame 8. The cable or cables 15 are connected at their lower ends with the frame 8 and at their upper ends with the lever 7. Thus, when the said lever is manipulated the frame 8 may be lowered or raised against the tension of the springs 11 and 12. The stub shaft 16 is journaled for rotation upon the frame 8 and is disposed transversely of the same. Said shaft is provided at its outer end with a sprocket wheel 17 and at its inner end with a beveled pinion 18. The shaft 19 extends longitudinally of the frame 8 and is journaled at its ends in bearings 20 provided upon the cross bars 21. The beveled pinion 22 is mounted upon the shaft 19 and meshes with the pinion 18. The hoes 23 are attached to the shaft 19 and operate under and within the arch portion 6 of the reach bar 5. One of the ground wheels 4 is provided with a sprocket wheel 24 and the sprocket chain 25 passes around the sprocket wheel 17 and 24. The forward end of the frame 8 is pointed and is provided with the tines 26 which are adapted to throw stalks and trash to the sides of the implement away from the plants as the implement is drawn along the same. The cross bars 21 are provided with the plows 27 each of which is provided with a spring actuated trip 28 by means of which the plow point may swing toward the rear in case it comes in contact with an obstruction while the said spring normally holds the point in proper position toward the soil. As the said plows are mounted upon both of the cross bars 21 the forward plows remove the earth from the sides of the row of plants prior to the operation of the hoes 23 upon the same and the rear plows list the earth back toward the row after the superfluous plants have been removed therefrom.

From the foregoing description it is obvious that a cotton chopper is provided having a frame provided with earth engaging elements which are held in contact with the soil under spring tension and which may be easily and readily raised out of engagement with the ground when the implement is drawn along the road or making a turn.

Having described my invention what I claim as new and desire to secure by Letters-Patent is:—

A cotton chopper comprising a frame having a pivoted axle and a fixed axle, wheels journaled upon the axles, a frame depending from the first said frame, springs interposed between the first said frame and the depending frame, those springs that are located under the pivoted axle having arcuate portions, pins mounted upon the pivoted axle and bearing against the arcuate portions of the springs and ground engaging elements carried by the depending frame.

In testimony that I claim the foregoing as my own, I have hereto affixed my signature in the presence of two witnesses.

WILLIAM ALONZO STOCKTON.

Witnesses:
M. O. HALL,
DEAN HALL.